US009529896B2

United States Patent
Doron et al.

(10) Patent No.: US 9,529,896 B2
(45) Date of Patent: Dec. 27, 2016

(54) HIERARCHICAL ONLINE-CONTENT FILTERING DEVICE AND METHOD

(75) Inventors: Moshe Doron, Petach-Tikva (IL); Elyasaf Korenwaitz, Elon More (IL)

(73) Assignee: NetSpark LTD, Petach Tikva (IL)

( * ) Notice: Subject to any disclaimer, the term of this patent is extended or adjusted under 35 U.S.C. 154(b) by 61 days.

(21) Appl. No.: 13/989,414

(22) PCT Filed: Dec. 28, 2011

(86) PCT No.: PCT/IL2011/050079
§ 371 (c)(1),
(2), (4) Date: May 24, 2013

(87) PCT Pub. No.: WO2012/098539
PCT Pub. Date: Jul. 26, 2012

(65) Prior Publication Data
US 2013/0238638 A1    Sep. 12, 2013

Related U.S. Application Data (60) Provisional application No. 61/433,539, filed on Jan. 18, 2011.

(51) Int. Cl.
*G06F 17/30*    (2006.01)
(52) U.S. Cl.
CPC ... *G06F 17/30699* (2013.01); *G06F 17/30994* (2013.01)
(58) Field of Classification Search
None
See application file for complete search history.

(56) References Cited

U.S. PATENT DOCUMENTS

| | | | | |
|---|---|---|---|---|
| 6,336,117 B1* | 1/2002 | Massarani | ...................... | 707/711 |
| 6,421,733 B1* | 7/2002 | Tso | ................... | G06F 17/30905 |
| | | | | 358/402 |
| 7,293,017 B2* | 11/2007 | Hurst-Hiller et al. | ........ | 707/740 |
| 7,444,403 B1* | 10/2008 | Packer et al. | ................. | 709/224 |
| 7,607,172 B2* | 10/2009 | Zurko | ................... | G06F 21/563 |
| | | | | 713/187 |
| 8,510,771 B2* | 8/2013 | Casagrande et al. | ........... | 725/32 |
| 2001/0033297 A1* | 10/2001 | Shastri | .................... | G06F 21/62 |
| | | | | 715/741 |
| 2002/0178381 A1* | 11/2002 | Lee et al. | ....................... | 713/201 |
| 2004/0210532 A1* | 10/2004 | Nagawa et al. | ................ | 705/51 |
| 2006/0041837 A1* | 2/2006 | Amir | ....................... | G06F 21/52 |
| | | | | 715/234 |
| 2006/0265689 A1* | 11/2006 | Kuznetsov et al. | .......... | 717/117 |
| 2007/0214263 A1* | 9/2007 | Fraisse et al. | ................ | 709/225 |
| 2008/0066149 A1* | 3/2008 | Lim | ............................... | 726/1 |
| 2008/0208868 A1* | 8/2008 | Hubbard | ........... | G06F 17/30867 |
| 2009/0089277 A1* | 4/2009 | Cheslow | .......................... | 707/5 |

(Continued)

*Primary Examiner* — James Trujillo
*Assistant Examiner* — Aida Tessema
(74) *Attorney, Agent, or Firm* — Steven C Lessoff (57) ABSTRACT

A system and method identifies structures within a presentation and detects undesired content in those structures. A decision is made whether to remove portions of the presentation containing the undesired content or the entire presentation, based on determining the domination of the undesired content within the structures of the presentation. The presentation can be reconstructed by being rendered without the undesired content or the structures containing the undesired content.

19 Claims, 9 Drawing Sheets

(56) References Cited

U.S. PATENT DOCUMENTS

| | | | |
|---|---|---|---|
| 2009/0132718 A1* | 5/2009 | Groll et al. | 709/229 |
| 2009/0157747 A1* | 6/2009 | McLean | G06F 17/30038 |
| 2009/0292984 A1* | 11/2009 | Bauchot | G06F 17/30896 |
| | | | 715/234 |
| 2010/0058204 A1* | 3/2010 | Wilson | G06F 17/30867 |
| | | | 715/760 |
| 2010/0174722 A1* | 7/2010 | Carteri | 707/748 |
| 2012/0047581 A1* | 2/2012 | Banerjee | G06F 21/554 |
| | | | 726/24 |
| 2013/0041907 A1* | 2/2013 | Shuster et al. | 707/754 |

* cited by examiner

Fig.1a

```
 1  <html>
 2   <head>
 3    <title>Example to the quilting results</title>
 4   </head>
 5   <body>
 6    <div>some text that should be remove since its an offending text</div>
 7    <div>some good text we should not touch it</div>
 8    <div>and here also some good text so it will not be removed
 9     <br>showing some list
10     <ol>
11      <li>some good text</li>
12      <li>some good text</li>
13      <li>some good text</li>
14      <li>some good text</li>
15      <li>some good text</li>
16      <li>some good text</li>
17      <li>some OFFENDING text</li>
18      <li>some good text</li>
19      <li>some good text</li>
20      <li>some good text</li>
21     </ol>
22    </div>
23   </body>
24  </html>
```

HIERARCHICAL ONLINE-CONTENT FILTERING DEVICE AND METHOD

RELATED APPLICATIONS

This patent application is a National Phase of PCT Patent Application No. PCT/IL2011/50079 filed 28 Dec. 2011 and claims the benefit of priority under 35 USC §119 (e) of U.S. Provisional Patent Application Ser. No. 61/433,539 filed 18 Jan. 2011.

FIELD AND BACKGROUND OF THE INVENTION

Various methods and systems to filter undesired content from online content are possible, and particularly, methods and systems may allow a viewer to receive desired online content while unobtrusively removing undesired parts.

The Internet represents a very valuable resource containing a large quantity of information and opportunity. Nevertheless, the Internet is uncontrolled and can also be a source of undesired content. Many users or Internet providers desire to be protected from undesired content that popularizes pornography, drugs, occultism, sects, gambling games, terrorism, hate propaganda, blasphemy, and the like. In order to allow access to desired content while shielding a user from undesired content, Internet filters have been developed.

Early Internet filters were generally based on the filtering of electronic addresses (Uniform Resource Locators, "URLs"). Software compared a website address with addresses contained in a prohibited site database (a black list) and prevented access to sites known to include undesired content. Such a methodology depends on the completeness of the prohibited site database. No one has ever compiled a complete indexed database that would make it possible to determine acceptable sites for any user. Furthermore, the number of web pages published grows exponentially making it more and more difficult to update URL databases. In addition, URL based filtering either completely blocks or completely allows a URL and all associated content. Often a single URL may include both valuable information and undesired content. URL-based filtering is not sufficiently specific to allow a user access to this information while blocking undesired content.

Figure 1A:
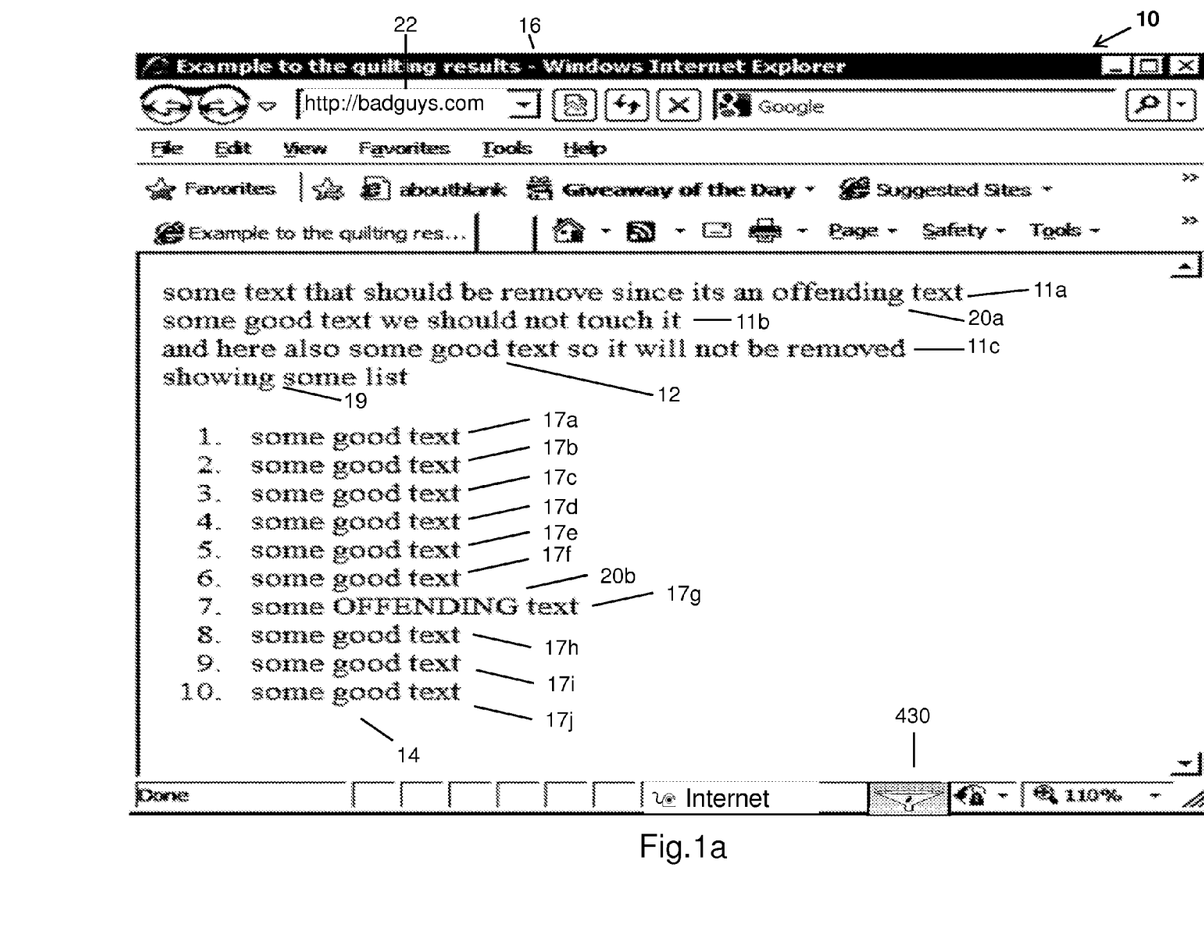
FIG. 1a is a screenshot of a simple example presentation including desired and undesired content.

FIG. 1a is a screenshot of an example of an on-line presentation 10 which is a simple web page. Presentation 10 includes a free text block 12 which is a structure including three elements, paragraphs 11a, 11b, and 11c. Presentation 10 also contains a list title 19, and a list 14 containing ten elements, list items 17a, 17b, 17c, 17d, 17e, 17e, 17f, 17g, 17h, 17i, 17j. Presentation 10 also contains a title 16. Inside presentation 10 there is also undesired content 20a in free text block 12 in paragraph 11a and other undesired content 20b inside of list 14 in item 17g. A URL source address 22 www.badguys.com of presentation 10 is shown in the address bar.

The HTML text source code for presentation 10 is illustrated in FIG. 1b. The HTML text source contains title 16. The beginning of title 16 is marked by a title start tag 15 and the end of title 16 is marked by a title end tag 15'.

The HTML source code contains free text block 12 with three paragraphs of text 11a-c. Each paragraph 11a,b begins with a start group tag <div> at the beginning of the paragraph and an end group tag </div> at the end of the paragraph.

The last paragraph 11c begins with a start group tag <div> but ends with a line break tag <br> marking the beginning of list title 19. After list title 19 the HTML text source contains list 14. The beginning of list 14 is marked by a list start tag 13 and the end of list 14 is marked by a list end tag 13'. Inside of list 14 are found ten elements, list items 17a-j. In list item 17g is found undesired content 20b. After list 14 is found the end group tag </div> of the group that started at the beginning of paragraph 11e.

Figure 2:
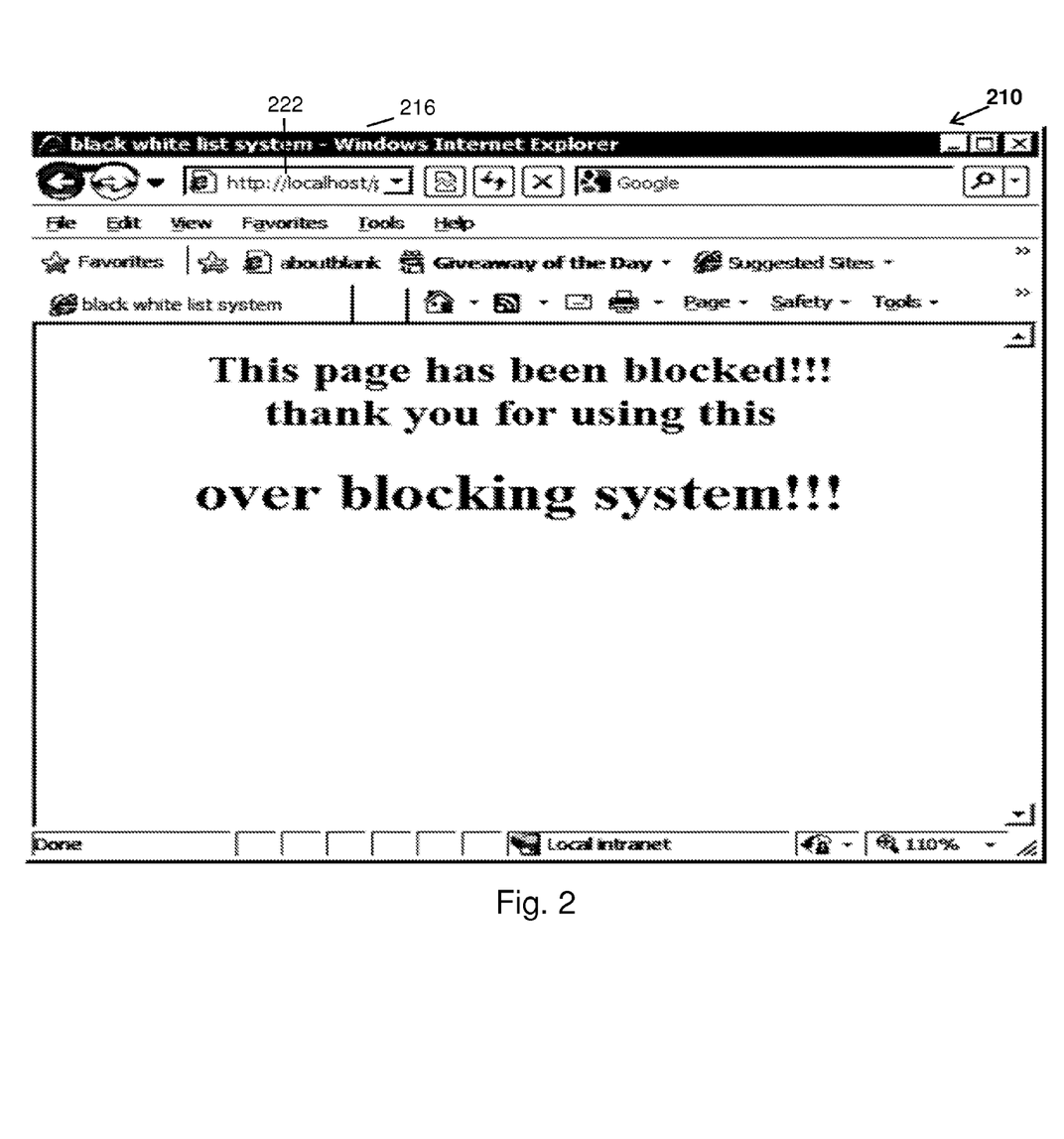

Referring to FIG. 2, a screenshot of the result of a first prior art Internet content filter acting upon presentation 10 is illustrated. The prior art system of FIG. 2 blocks all content from any address in a black list. Thus, because URL source address 22 www.badguys.com is black listed, presentation 10 is entirely blocked and in its place a substitute presentation 210 having a substitute title 216 from a substitute URL source address 222 is rendered. Substitute presentation 210 is obtrusive and has prevented a user from accessing any of the useful information of presentation 10.

More recently, content based filtering has been introduced. In content-based filtering a viewing object is analyzed for evidence of inappropriate content. If inappropriate content is found, the content is blocked.

For example, United States Patent Application 2007/0214263 teaches analysis of an HTML page and its associated links and a decision to allow or block the page based on the identified content. The blocking of entire HTML pages is undesirable as such blocking prevents access to both useful and undesired content of the page.

United States Patent Application 2003/0126267 further allows blocking of undesired items inside an electronic media object (for example blocking or blurring of an objectionable picture or removal of objectionable words and their replacement by some neutral character).

Figure 3:
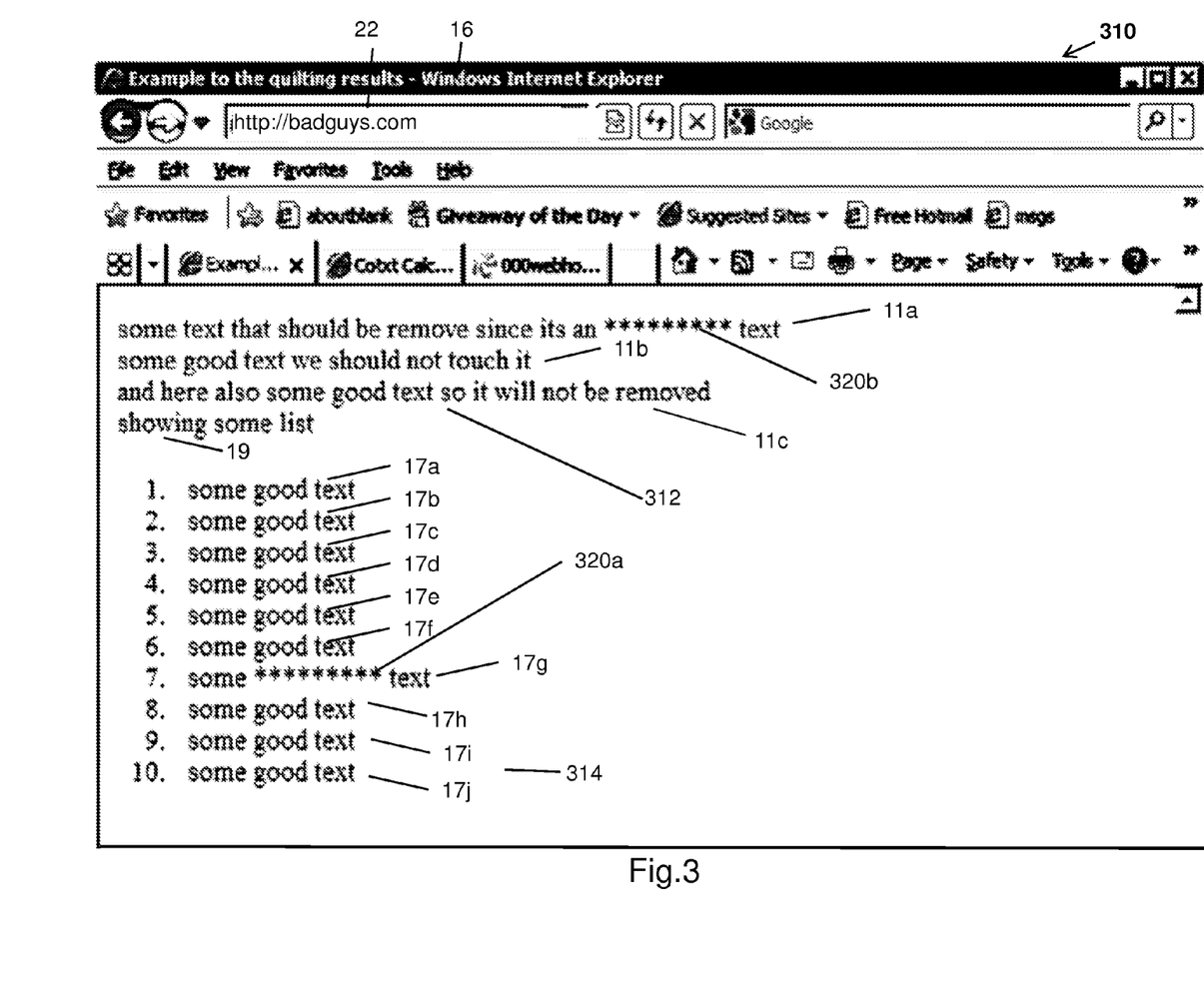

Prior art blocking of undesired content is illustrated in FIG. 3. Presentation 10 is replaced by a sanitized presentation 310 which includes free text 312, list 314 and a title 316. Free text 312 is similar to free text 12 except that undesired content 20b has been blocked by inserting blocking characters 320b. Similarly, list 314 is similar to list 14 except that undesired content 20a has been blocked by inserting blocking characters 320a. URL source address 22 www.badguys.com and title 16 of presentation 10 are still displayed. Thus, the prior art content blocking system removes undesired content without accounting for or adjusting the structure of the presentation. In the resulting sanitized presentation, the content of the presentation no longer fits the structure of the presentation. The result is that remaining structural items (in the example of FIG. 3, paragraph 11a and list item 17g) are unsightly, unnecessary, and may even include further undesired content associated with the removed content (in the example of FIG. 3, undesired content 20a,b).

Blocking of part of a presentation (by erasing or obscuring) is obtrusive and unsightly. Furthermore, in many applications, such blocking is not effective. For example, a school may desire to filter out predatory advances, links or search results. Just removing objectionable words may leave the links active and endanger students or even increase the danger by arousing their curiosity and encouraging them to actually visit the source of the blocked content to see what they are missing. Alternatively, one may indiscriminately black out a zone of the screen around an undesired object (e.g., an undesired picture or word) in order to also block associated content. If the blocked zone is large then this results in obscuring a lot of potentially valuable content. If the blocked zone is small then there is a substantial risk that related undesired content will not be blocked.

The above limitations of the prior art are particularly severe for data sources containing a large variety of content from different sources, for example Web 2.0-based technologies (e.g., Facebook) and the like (e.g., Wikipedia, search engines). In such applications, content from unrelated sources are organized together in a single webpage. It is therefore, on the one hand desirable to remove objectionable content along with associated data, and on the other hand it is desirable to leave unaffected data that is not associated with undesired content.

Therefore it is desirable to have an unobtrusive filter that removes undesired content and associated data without disturbing desired content and its presentation.

SUMMARY OF THE INVENTION

Various methods and systems to filter undesired content from a presentation while permitting access to desired content are possible.

An embodiment of a method for filtering undesired content from an on-line presentation may include identifying a structure in the presentation and detecting undesired content in the structure. Then a level of domination over the structure by the undesired content may be determined. According to the result of the determination of the dominating by the undesired content over the structure all of the structure or a portion of the structure may be disabled.

In an embodiment of a method for filtering undesired content from an on-line presentation the identification of a structure may include locating a beginning and an end of the structure.

In an embodiment of a method for filtering undesired content from an on-line presentation the structure may be a list and the identifying of the structure may include recognizing repeated form.

In an embodiment of a method for filtering undesired content from an on-line presentation the structure may be a list, a menu, a question with an answer, a graphic with associated text, a link with associated text, or a block of text.

An embodiment of a method for filtering undesired content from an on-line presentation may further include distinguishing a substructure in the structure. The undesirable content may be within the substructure and the determining of domination of the structure by the undesired content may include accounting for a relationship between the substructure and the structure.

In an embodiment of a method for filtering undesired content from an on-line presentation the substructure may be a question, an answer, a link, text associated to a link, a graphic, text associated with a graphic, a list item, a menu item, a target of a link, a sentence or a paragraph.

In an embodiment of a method for filtering undesired content from an on-line presentation the disabling may be unobtrusive.

An embodiment of a method for filtering undesired content from an on-line presentation may further include rebuilding a rebuilt presentation. In the rebuilt presentation, the structure containing the undesired content or a portion thereof may be disabled.

In an embodiment of a method for filtering undesired content from an on-line presentation the rebuilding may include retaining white spaces from the original presentation in the rebuilt presentation.

In an embodiment of a method for filtering undesired content from an on-line presentation the identifying of structures may include recognizing an improper form and the rebuilding a rebuilt presentation may include retaining the improper form in the rebuilt presentation.

In an embodiment of a method for filtering undesired content from an on-line presentation, the presentation may include a plurality of structures and the steps of determining and disabling may be applied to each of at least two structures from the plurality of structures.

In an embodiment of a method for filtering undesired content from an on-line presentation the disabling may be applied to all of the plurality of structures.

An embodiment of a system for removing undesired content from a presentation stored on an electronically accessible memory may include a memory configured for storing a first database of information on a structure of the presentation and a second database configured for storing data on the undesired content. The system may also include a processor configured for identifying the structure in the presentation, detecting the undesired content in the structure, determining a domination of the structure by the undesired content and disabling the structure or a portion thereof according to whether the undesirable content is determined to dominate the structure.

In an embodiment of a system for filtering undesired content from an on-line presentation, the processor may be further configured for locating a beginning and an end of the structure.

In an embodiment of a system for filtering undesired content from an on-line presentation, the processor may be further configured for recognizing a repeated form in a list.

In an embodiment of a system for filtering undesired content from an on-line presentation, the processor may be further configured for distinguishing a substructure in the structure and the undesirable content may be within the substructure. The determination of whether the structure is dominated by the undesired content may include accounting for a relationship between the substructure and the structure.

In an embodiment of a system for filtering undesired content from an on-line presentation, the processor may be further configured for performing the disabling of the structure unobtrusively.

In an embodiment of a system for filtering undesired content from an on-line presentation, the processor may be further configured for rebuilding a rebuilt presentation including the disabled the structure.

In an embodiment of a system for filtering undesired content from an on-line presentation, the processor may be further configured for retaining a white space from the original presentation in the rebuilt presentation.

In an embodiment of a system for filtering undesired content from an on-line presentation, the processor may be further configured for retaining an improper form from the original presentation in the rebuilt presentation.

An embodiment of a system for filtering undesired content from an on-line presentation, may further include an output device for displaying the rebuilt presentation to a viewer.

TERMINOLOGY

The following term is used in this application in accordance with its plain meaning, which is understood to be known to those of skill in the pertinent art(s). However, for the sake of further clarification in view of the subject matter of this application, the following explanations, elaborations and exemplifications are given as to how the term may be used or applied herein. It is to be understood that the below explanations, elaborations and exemplifications are to be taken as exemplary or representative and are not to be taken as exclusive or limiting. Rather, the term discussed below is to be construed as broadly as possible, consistent with its ordinary meanings and the below discussion.

A presentation is a structure containing content formatted for displaying to a user. The displaying may be via sound (for example, for playing over a loudspeaker) or via light (for example, for displaying on a computer monitor). Common examples of presentations are a web page (e.g., in HTML format), a PowerPoint© presentation, a Portable Document Format (PDF) file, and a Microsoft© Word file.

BRIEF DESCRIPTION OF THE DRAWINGS

Various embodiments of a system and method for filtering undesired content are herein described, by way of example only, with reference to the accompanying drawings, where:

FIG. 1b is an example of HTML source code for the simple example presentation of FIG. 1a;

FIG. 2 is a screenshot illustration of the result of a first prior art Internet content filter acting upon the presentation of FIG. 1a;

FIG. 3 is a screenshot illustration of the result of a second prior art Internet content filter acting upon the presentation of FIG. 1a;

FIG. 4 is a flowchart illustration of an embodiment of a Hierarchical method of filtering undesired content from the presentation of FIG. 1a;

FIG. 5 is a screenshot illustration of the result of an embodiment of a Hierarchical online-content filter acting upon the presentation of FIG. 1a;

FIG. 7 is a screenshot illustration of the result of an embodiment of a Hierarchical online-content filter acting upon the presentation of FIG. 1a;

DESCRIPTION OF THE PREFERRED EMBODIMENTS

The principles and operation of filtering undesired content according to various embodiments may be better understood with reference to the drawings and the accompanying description.

In sum, although various example embodiments have been described in considerable detail, variations and modifications thereof and other embodiments are possible. Therefore, the spirit and scope of the appended claims is not limited to the description of the embodiments contained herein.

Figure 4:
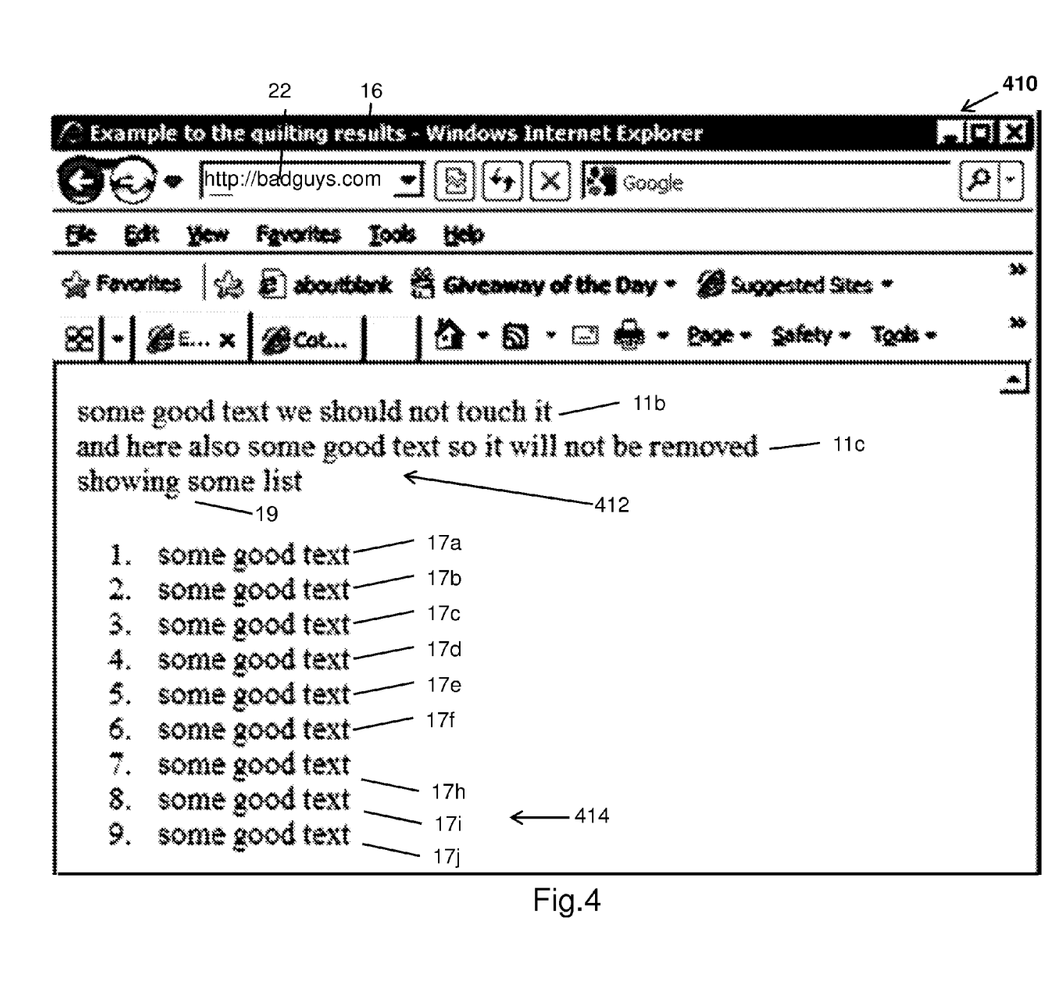

FIG. 4 is a screenshot illustration of a rebuilt presentation 410 resulting from applying an embodiment of a Hierarchal online-content filter acting upon presentation 10. Conceptually, in the embodiment FIG. 4, the Hierarchal filter pays attention to the structure of a presentation when deciding whether to remove material and what material to remove. The Hierarchal filter of FIG. 4 does this by removing undesired content 20a-b and associated structure so that the structure of the rebuilt (sanitized) web page corresponds to the reduced content that is presented. Generally, in FIG. 4, the original web page (illustrated in FIG. 1a) is displayed with undesired content 20a and 20b. Unlike prior art page blocking systems (as illustrated in FIG. 2) the original source address and useful information in paragraphs 11b and 11c as well as useful information in list items 17a-f and 17h-j are available to the viewer. In order to remove undesired content 20a and 20b, without destroying the appearance of the web page, the entire paragraph 11a and the entire list item 17g have been removed. Unlike prior art contents blocking systems (as illustrated in FIG. 3), presentation 10 remains in a clear, pleasing format. In fact, if the user is not informed he may not be aware that the original web page has been changed. In the embodiment of FIG. 4, the user is notified that some data from the presentation has been blocked by a status bar icon 430 (for example see FIG. 1a) that informs the user that content has been filtered. Notification could also be by a pop up window or an icon or a start bar icon or the like.

Figure 5:
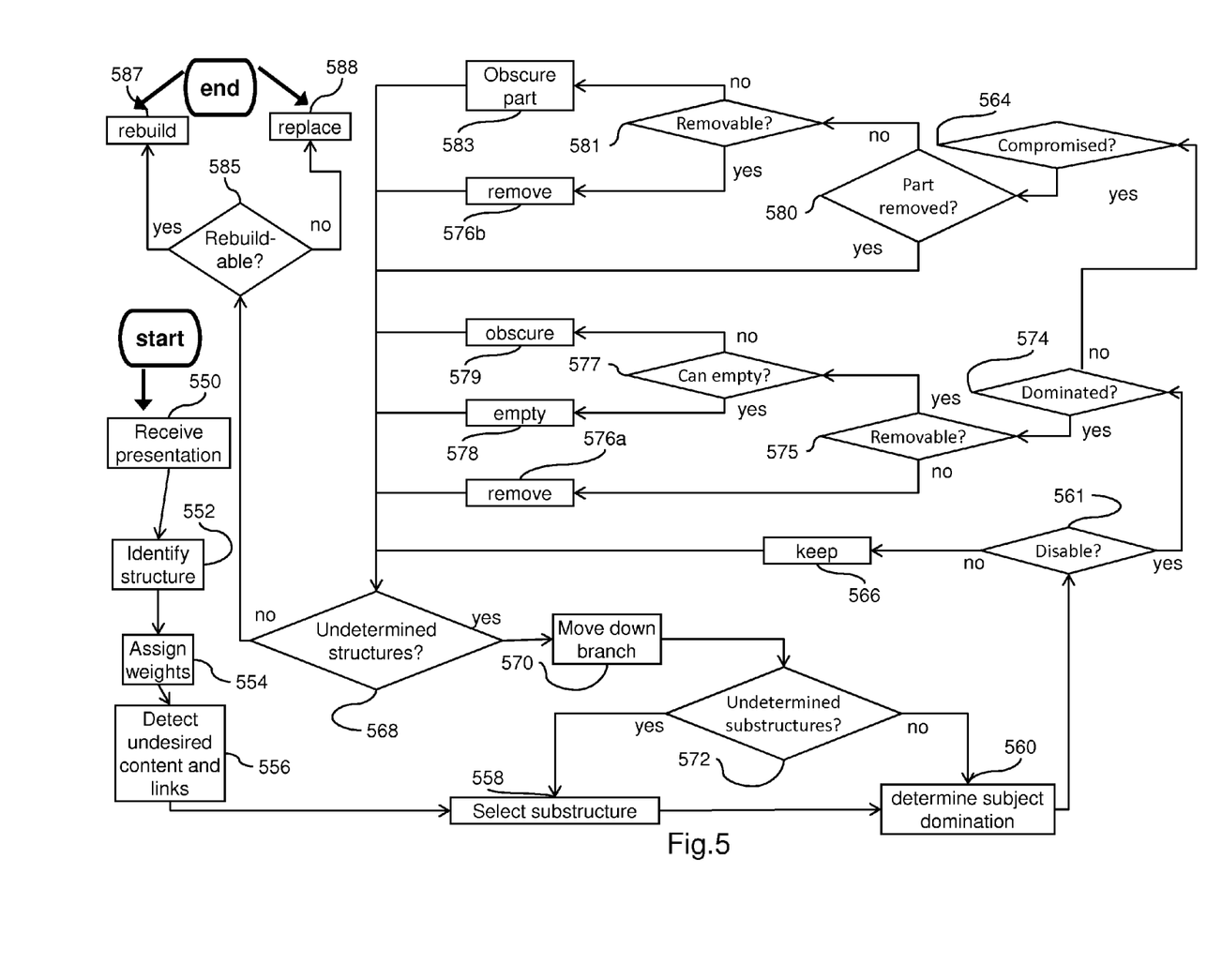

FIG. 5 is a flowchart illustrating a method of Hierarchical filtering of an on-line presentation. The method begins by receiving 550 a presentation for filtering. Structure of the presentation is identified 552 by building a tree of the HTML source code of the presentation; the tree organizes data on the locations of the beginnings and ends of various structural items in the presentation and their interrelation (which structure is a substructure of which larger structure).

Specifically, in the example of FIG. 1b, identifying 552 structure includes identifying and mapping by beginning and end of each structure and substructure. The location of the beginning and end of presentation 10 are marked <html> and </html> respectively and are located at lines 1 and 24, respectively. Inside presentation 10 are two substructures: a head which begins and ends with <head> and </head> at lines 2 and 4, respectively; and a body which begins and ends with <body> and </body> at lines 5 and 23, respectively. The head contains one substructure, title 19 while the body contains three subsections marked as groups (each group starting with <div> and ending with </div>). The first two groups contain paragraph 11a, which starts and ends on line 6 and paragraph 11b, which begins and ends on line 7, respectively. The third group begins on line 8 and ends on line 22. The third group includes two subsections: the first subsection is paragraph 11e that begins at the beginning of the third group on line 8 and ends at the line break <br> at the beginning of line 9; the second subsection includes list title 19 on line 9 and list 14 which begins and ends with markers 13 and 13' on lines 10 and 21, respectively. List 14 is recorded as containing ten substructures list items 17a-j. Each list item 17a-j begins with a <li> and ends with a </li> and is found on one line in lines from 11-20.

Then each substructure is assigned 554 a weight representing its importance in regards to the larger structure in which it is contained. Assigning 554 of weights depends on the number of substructures, the type of structure, the types of substructures and the size of location of the substructures.

For example in presentation 10, title 16 is obviously a title of the presentation (this is understood due to the start and end title tags 15 and 15' and also because a short text such as title 16 preceding a large structure is assumed to be a title). Therefore, although title 16 is not quantitatively a large part of presentation 10, nevertheless, accounting for the important structural relationship between title 16 and presentation 10, title 16 is given a weight of 20%. The remaining body from lines 5-23 is assigned a weight of 80%. For a general object like the web page of presentation 10 if 12% of the substructures are dominated by undesired material, then the result of the step of determining 560 would be that the entire presentation 10 would be defined as dominated by undesired material. Thus if either title 16 or the body of the web page were found to be dominated by undesired material, the entire page will be disabled 561 (by blocking or the like).

Then the substructures of the body section (from lines 5-23) are assigned weights with respect to the body. No structural relation is found between the four groups of the body section. Therefore, each group is assigned 554 a weight in the section according to its size. The third group contains 14 lines of content. Therefore, the first two groups each containing one line paragraph 11*a-b* respectively, are each given a weight of 1/14=7%. The third group has 13 lines with content and receives a weight of 86%. No particular pattern is recognized in the body section. For a general object like the body of presentation 10 if 12% of the substructures are dominated by undesired material, then the body is defined as dominated by undesired material.

List 14 is easily recognized as a list due to the markers <ol> and <li> and also due to the fact that it contains a large number of similar structures (lines 11-20 each containing a line of text preceded by <li> and followed by </li>). The relationship between structures is taken into account when determining subject domination of a structure. For example, it is assumed that a list may contain a lot of unrelated items. Therefore, list 14 will not be judged as dominated by undesired material in list items 17*a-j* unless a majority of list items 17*a-j* contain undesired content. Each list item 17*a-j* is assigned a weight of 100/10=10%.

Based on the principles listed above, many embodiments of weighting of substructures are possible. It will be understood that the weights of substructures do not necessarily have to add up to one hundred.

Next, undesirable content is detected 556. Methods of detecting 556 undesired content are known and will not be enumerated here. Nevertheless, it is emphasized that mapping of structure improves the specificity of the detection 556. For example, one method of detecting 556 undesired content is searching for word combinations. More specifically, if the words "exciting" and "girls" are found in a presentation they will be taken to be undesired content (sexually exploitative), whereas if the word "sizes" is also found in the presentation the content will be treated as innocuous (probably a clothing advertisement). Mapping 554 structure before detecting 556 undesired content increases the specificity of detecting 556. For example, a search list may contain both clothing advertisements and sexually exploitive material. Judging the undifferentiated page may result in assuming that the sexually exploitive material is part of the clothing advertisement and allowing it through, or on the other hand the clothes advertisement may be treated as part of the sexually exploitive material and blocked. By separating out structures and detecting 556 content in each structure individually, interference between objects is avoided and the sexually exploitive material will be blocked while the innocuous material is allowed through.

Once undesired material has been detected 556, the process goes through selecting 558 structures (starting from the branches of the tree and moving towards the trunk) determining 560 their domination by undesired subject matter. For example, in presentation 10 we start by selecting list item 17*a* (a branch that has no substructures) and determine 560 that it is not dominated by undesired material since it contains no undesired material. List item 17*a* contains no undesired material; therefore, the results of the step of determining 560 is that list item 17*a* is not dominated or even compromised by undesired content. Therefore according to the result of determining 560, list item 17*a* will not be disabled 561. Therefore, the content of list item 17*a* will be kept 566 without changes.

Since there are still undetermined 568 structures, the process moves down 570 to the next lower branch (towards the trunk) which is list 14. Since there are still undetermined substructures 572 in list 14 another substructure, list element 17*g* is selected 558 and determined 560. In the case of list element 17*g* one of three words is undesired, making it 33% undesirable content. The threshold for subject domination is 12%<33%. Therefore, the result of determining 560 for list element 17*g* is that list item 17*g* is dominated by undesired material and according to this result, list item 17*g* is to be disabled 561. How the structure is disabled is also according to the result of determining 560, whether list item 17*g* is dominated 574 by undesirable content or only compromised 564 without being dominated 574. Since list element 17*g* is dominated 574 by undesirable content 20*b*, and it is possible 575 to remove the entire list element 17*g*. Therefore, list element 17*g* is removed in its entirety (line 17 is removed). If it were not possible 575 to remove the entire substructure (e.g., list item 17*g*), then if the entire contents could 577 be removed, then the substructure would be kept but emptied 578 of all contents (e.g., all text would be removed from list item 17*g* but the empty line would remain in the list). If the entire contents could 577 not be removed, then the substructure would be obscured 579. The outcome of disabling 561 list item 17*g* by removing 576*a* list item 17*g* is list 414 having only nine list items 17*a-f* and 17*h-j* illustrated in rebuilt presentation 410 (FIG. 4).

After determining 560 the last of list elements 17*a-j* when the method moves down 570 again to list 14 and there are no longer any undetermined substructures 572, then the domination of the parent branch, list 14 will be determined 560. Only one list element 17*g* of ten elements 17*h-j* is undesired. Therefore list 14 is 10% undesirable material. Since list 14 contains undesirable material, list 14 will be disabled 561 at least partially. Nevertheless, as stated above, a list is only deemed dominated by undesirable material if it is 50% undesirable, and therefore, list 14 is not dominated 574 by undesirable material. Nevertheless, list 14 is compromised 564 by undesirable material (it contains undesired material in list item 17*g*). Since the undesirable material has already been removed 580, then list 14 is not further touched and remains with only nine list items 17*a-f* and 17*h-j* (as depicted in FIG. 4).

If it was not possible to remove 580 the undesired content alone, then if possible 581 the entire compromised structure would be removed 576*b*. If the entire structure could not be removed, then the undesired content would be obscured 583.

The process continues until all structures in the presentation are determined 560. When there do not remain any undetermined 568 structures, it is tested whether 585 the presentation can be rebuilt 587. Since, in the case of presentation 10 all that was removed was a paragraph of text and a single list item, it is easy to rebuild 587 the presentation without the removed structures. Therefore, the presentation is rebuilt 587 as shown in FIG. 4. When it is necessary to remove a large number of complex structures, it may not be possible to rebuild the original presentation properly. Generally, the presentation is kept as much as possible. Thus, along with keeping track of the content of the presentation, white spaces are also tracked and preserved. Similarly, if there are improper structures (for example structures that are improperly nested or lacking an end statement) there is no need to correct the presentation. Nevertheless, when there are significant problems building the tree of the presentation (for example there were errors in the page and it was not possible to match the beginning and end of each structure) and material has to be removed from ambiguous parts of the presentation (where the structure is unclear), it may not be possible to rebuild 587 the presentation. When the presentation cannot be rebuilt, the presentation will be replaced 588 with a replacement presentation. The replacement presentation may contain in part the contents of the original contents of the replaced presentation.

Figure 6:
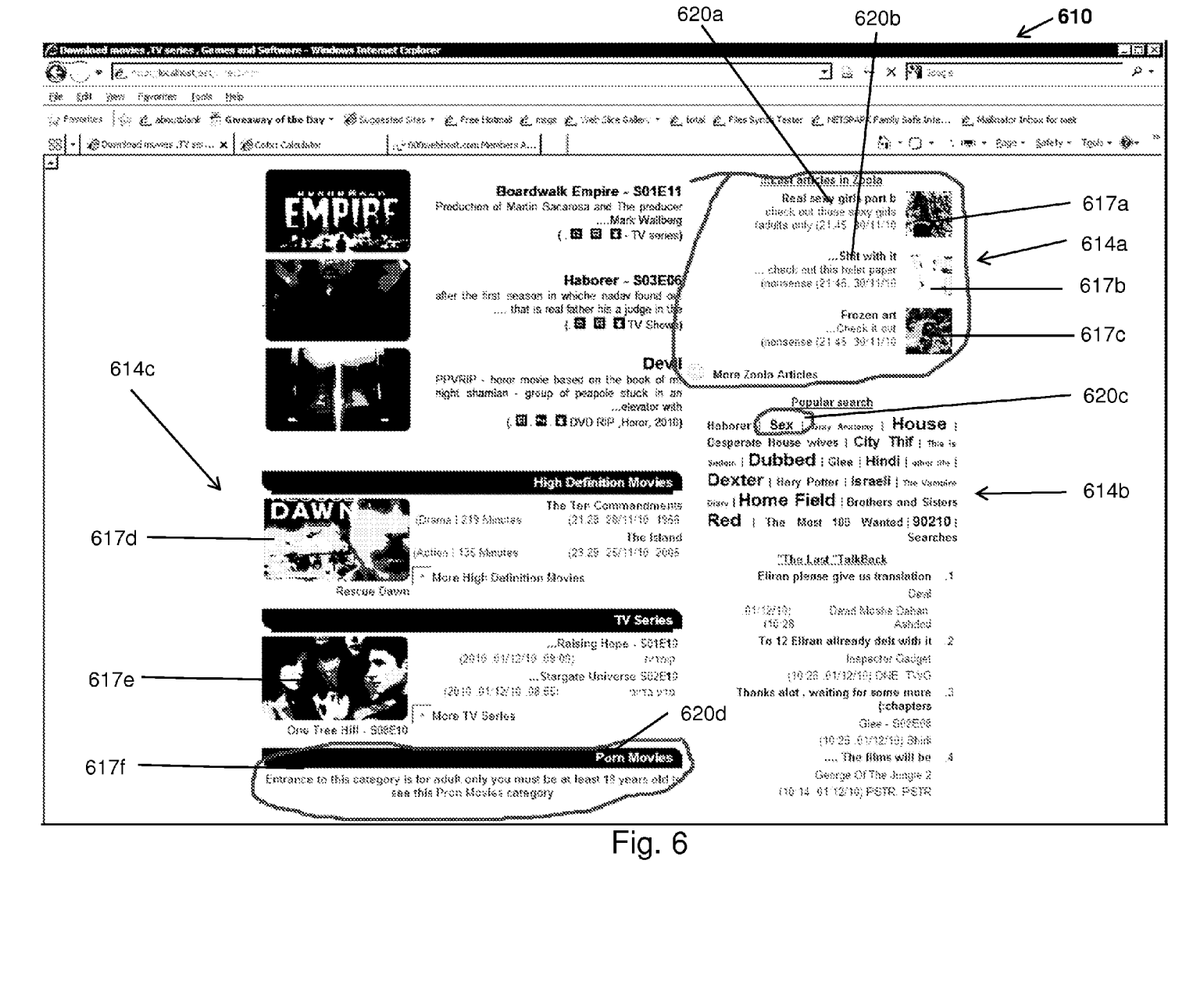
FIG. 6 is a screenshot of a typical presentation from the Internet.

FIG. 6 is a screenshot of a typical presentation 610 from the Internet which contains undesirable content 620a-d.

Undesired content 620a and 620b are in the titles of two list items 617a and 617b from a list 614a composed of three list items 617a, 617b and 617c. The structure of list 614a is easy to recognize because the three list items 617a, 617b and 617c all consist of a repeated structure, a picture associated to a few lines of text. Furthermore, in each list item 617a-c the text starts with a line in bold face, which is the title. Because list items 617a and 617b include undesired content in their titles, they are therefore determined to be dominated by undesired subject matter. Since two thirds of the items in list 614a (66% of its content) is undesired, then list 614a is determined to be dominated by the undesired content.

Other structures that are recognizable in HTML documents are questions and answers, links (including hyperlinks), text associated to pictures and links, menus and menu items, sentences, paragraphs and the like. For example, it may be decided that whenever an answer is disabled due to undesired content, a question associated with the answer will also be disabled.

Undesired content 620c is a hyperlink in list 614b of hyperlinks. List 614b is much less than 50% undesired content. Therefore, although list 614b is compromised by undesired content 620c, list 614b is not dominated by undesired content.

Undesired content 620d is a list item 617f in a list 614c. List 614c contains three list items 617d, 617e and 617f. Undesired content 620d is in the title of list item 617f. Therefore, list item 617f is determined to be dominated by undesired content 620d. Nevertheless, list 614c is only 33% compromised by undesired content 620d. Therefore, although list 614c is compromised by undesired content 620d, list 614c is not dominated by undesired content 614d.

Figure 7:
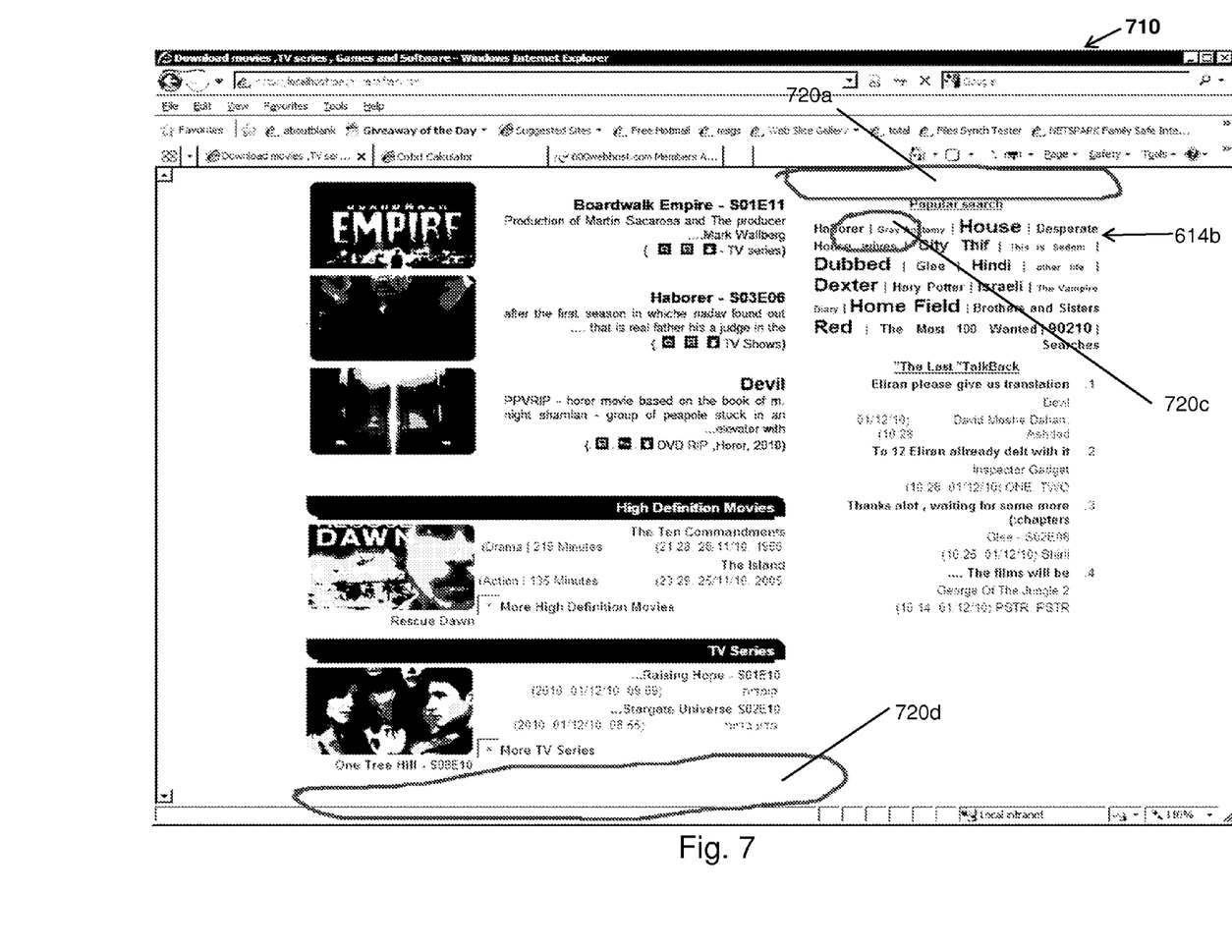

FIG. 7 illustrates a rebuilt presentation 710 which results from filtering presentation 610 with a Hierarchical content filter. Undesired content 620a-d has been removed unobtrusively. Therefore, rebuilt presentation 710 looks clean and presentable and most of the information from the original presentation 610 is still available. Furthermore, items associated with undesired contents 620a-d which are themselves undesirable (such as the text and pictures in list items 617a, 617b and 617f) have been removed. The entire list 614a was removed and the space is automatically filled by moving up table 614b as shown by collapsed space 720a. Undesired content 620c was removed and the space 720c was filled by incrementing table 614b. List item 617f was removed and the collapsed space 720d is made up by shortening rebuilt presentation 710.

Figure 8:
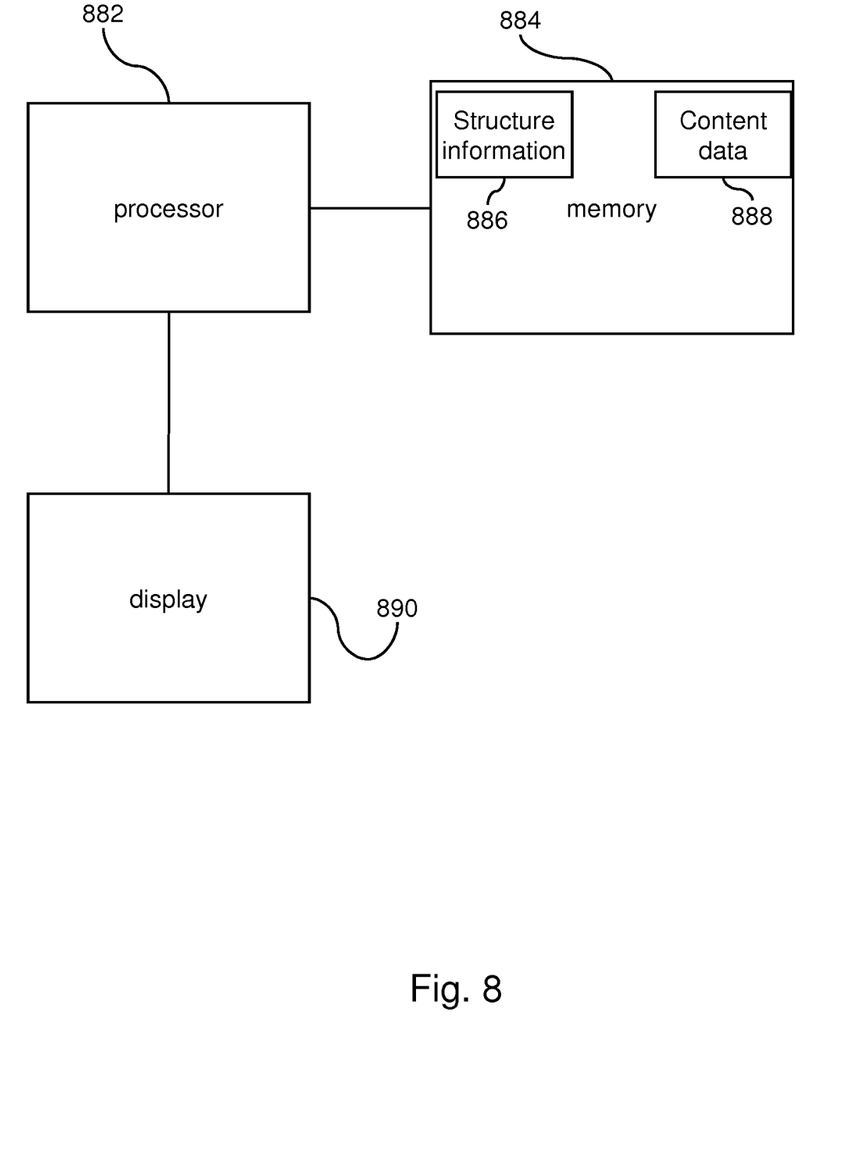
FIG. 8 is an illustration of an embodiment of a system for Hierarchical filtering undesired content from an electronically accessible presentation.

FIG. 8 is an illustration of an embodiment of a system for Hierarchical filtering of an electronically accessible presentation. The system includes a processor 882 in communication with a memory 884. Stored in memory 884 is data on undesired content 888 and information on structure of the electronically accessible presentation 886. The presentation as well as instructions for processor 882 to perform tasks enumerated herein below are also to be stored in memory 884.

In order to filter undesired content from the presentation, processor performs the following tasks according to instructions stored in memory 884. Processor 882 identifies a structure in the presentation, detects an undesired content in the structure, determines a domination of the structure by the undesired content. Then according to the results of the step of determining (whether the structure is dominated by or just compromised by the undesired content) processor 882 disables all of the structure or just a portion of the structure. Processor then rebuilds the presentation with the disabled structure and sends the rebuilt presentation to a display 890 for viewing.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for on-line filtering of undesired content from a presentation built from a source code and for displaying the filtered presentation to a user comprising:
   a) identifying a plurality of structures and a plurality of substructures of at least one structure of said plurality of structures in the source code; said at least one structure having a beginning marked by a first marker and an end marked by a second marker; each substructure of said plurality of substructure having a respective beginning marker and wherein each said respective beginning marker is located between said first marker and said second marker and wherein each of said plurality substructures beginning with said respective beginning marker ends with a respective end marker;
   b) detecting the undesired content in said plurality of substructures;
   c) determining at least one substructure dominated by said undesired content;
   d) disabling said at least one substructure according to said determining; said disabling resulting in a a sanitized structure, without the undesired content;
   e) removing said sanitized structure from said presentation when said sanitized structure does not correspond to said structure such that displaying said sanitized structure in the presentation would make the user aware of said disabling and arouse a curiosity of the user of said presentation towards a said undesired content;
   f) sending said source code including an outcome of said disabling and said removing; to an output device for rebuilding and display to the user;
   g) performing a first action when a combination of a first word and a second word is detected between said respective beginning marker and said respective end marker of a single substructure of said plurality of substructures: and
   h) performing a second action different from said first action and when first word is in said single substructure and said second word is not in said single structure and said second word is in another substructure of said plurality of substructures.

2. The method of claim 1, wherein said at least one substructure is a list and said identifying includes recognizing repeated form.

3. The method of claim 1, wherein said at least one structure includes at least one item selected from the group consisting of a list, a menu, a question with an answer, a graphic with associated text, a link with associated text, block of text.

4. The method of claim 1, wherein said each of said plurality of substructures includes at least one component selected from the group consisting of a question, an answer, a link, text associated to a link, a graphic, text associated with a graphic, a list item, a menu item, a target of a link, a sentence and a paragraph.

5. The method of claim 1, wherein said rebuilding retains a white space from said presentation in said rebuilt presentation.

6. The method of claim 1, wherein said source code includes an improper form and further comprising
g) retaining said improper form.

7. A system for filtering undesired content from a presentation built from a source code stored on an electronically accessible memory comprising:
  a) a memory configured for storing:
    i) a first database of information on a plurality of structures of the presentation; said information including a location of a first marker marking a beginning of at least one of said plurality of structures and a location of a second marker marking and end of said at least one structure and a respective location of each of a plurality of respective beginning markers; each said respective beginning marker marking the beginning of a respective substructure; each said respective location being between said first marker and said second marker; wherein each said respective substructure ends with a respective end marker said first marker, said second marker and all said respective beginning markers being in said source code, and
    ii) a second database configured for storing data on the undesired content, and
  b) a processor configured for:
    i) identifying each said respective substructure;
    ii) detecting the undesired content in said respective substructures;
    iii) determining at least one said respective substructure dominated by the undesired content;
    iv) disabling a said at least one respective substructure according to a result of said determining; said disabling resulting in a sanitized structure without the undesired content, and
    v) removing said sanitized structure from said presentation when said sanitized structure does not correspond to said structure such that presenting said sanitized structure in the presentation would make a user aware of the disabling and arouse a curiosity of the user of said presentation towards a said undesired content,
    vi) performing a first action when a combination of a first word and a second word is detected between said respective beginning marker and said respective end marker of one said respective substructure; and
    vii) performing a second action different from said first action and when first word is in said one respective substructure and said second word is not in said one respective structure and said second word is in another substructure of said; respective substructures; and
  c) an output device for rebuilding and displaying a rebuilt presentation to the user said rebuilt presentation built according to said source code and said disabling and said removing.

8. The system of claim 7, wherein said processor is further configured for:
  v) recognizing a repeated form in a list.

9. The system of claim 7, wherein said processor is further configured for:
  vi) determining a domination of said at least one structure by said undesired content and
  vii) accounting for a relationship between said at least one respective substructure and said at least one structure in said determining a domination of said at least one structure.

10. The system of claim 7, wherein said processor of further configured for
  vi) retaining a white space from the presentation in said rebuilt presentation.

11. The system of claim 7, wherein said processor is further configured for:
  vi) retaining an improper form from the presentation in said rebuilt presentation.

12. The method of claim 1, wherein said rebuilding includes keeping the rebuilt presentation clean with an appearance of an unchanged presentation.

13. The method of claim 1, further comprising:
  determining a domination of said at least one structure by the undesired content and
  quantifying a portion of said respective substructures that is dominated by the undesired content.

14. The method of claim 13, wherein said quantifying a portion includes assigning a weight to each of said respective substructures and wherein a first weight of one substructure of said respective substructures differs from a second weight of a second of said respective substructures and wherein said quantifying includes computing a function of said first weight and said second weight.

15. The method of claim 1, further comprising:
  g) testing whether said the presentation with the disabled portion can be rebuilt according to said source code and said disabling and said removing.

16. The method of claim 1, wherein said identifying a plurality of structures includes building tree of the presentation; the tree organizing data on the locations of the beginnings and ends of each of said a plurality of structures in the presentation and their interrelation including a substructure of at least one of said plurality of structurals.

17. The method of claim 1, wherein said disabling includes resizing one of said plurality of substructures.

18. The method of claim 1, wherein said rebuilding includes shortening the presentation.

19. The method of claim 1, wherein said removing further includes filling an empty space in said presentation.

* * * * *